INVENTOR
JAMES L. DURBIN

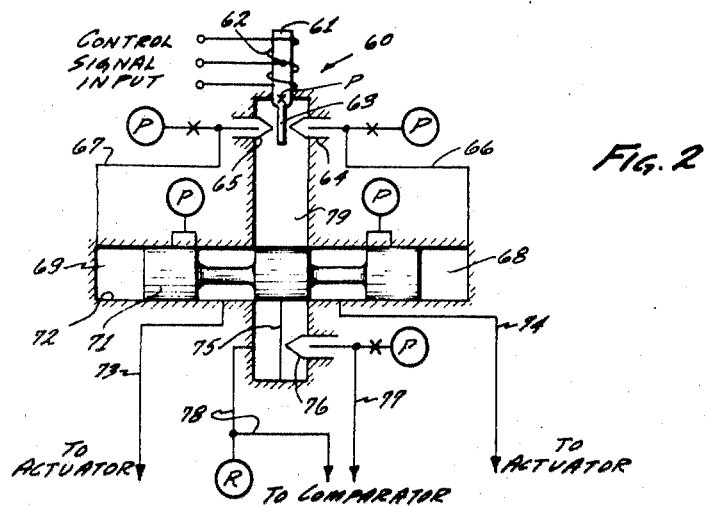

United States Patent Office 3,488,029
Patented Jan. 6, 1970

3,488,029
RETURN PRESSURE COMPENSATED HYDRAERIC SIGNAL COMPARATOR
James L. Durbin, Burbank, Calif., assignor to Bell Aerospace Corporation, a corporation of Delaware
Filed Apr. 11, 1968, Ser. No. 720,629
Int. Cl. F16k *31/12;* F15b *11/08, 13/04*
U.S. Cl. 251—26    8 Claims

ABSTRACT OF THE DISCLOSURE

Disclosed is a redundant control system having a comparator therein which receives both the pressure monitor signals and system return pressure from each of the control channels within the redundant system for the purpose of comparing the monitor signals and producing an error signal in the event of a discrepancy between the pressure monitor signals. The error signal is utilized to actuate switch means that disables the faulty portion of the system. The comparator utilizes pressure sensitive means which is connected so as to be sensitive only to discrepancy in the pressure monitor signals and to be insensitive to variations in the system return signal.

BACKGROUND OF THE INVENTION

The need and desirability for redundant control systems using a plurality of fluid pressure sources is well recognized in the prior art; for example, see U.S. Patents 3,171,329, 3,190,185, 3,198,082, 3,257,911, 3,270,623, 3,338,138, 3,338,139. In utilizing such redundant control systems wherein the monitor signal is a fluid pressure signal such, for example, as shown in U.S. Patents 3,338,138 and 3,338,139, it has been discovered that variations in the return pressure between system pressure sources may generate pressure signals which are applied to the comparator. Such pressure signals result in the comparator producing an output signal which is applied to the switch means, thus causing the system to transfer control. It has been further determined that variation in return pressures from system pressure source to system pressure source under normal operating conditions may be as much as 1500 p.s.i.

SUMMARY OF THE INVENTION

A pressure signal comparator in accordance with the present invention includes first and second pressure sensitive means, each of which is connected to receive first and second pressure signals and the respective returns associated therewith. Means interconnects the first and second pressure sensitive means so as to provide an output signal when the algebraic sum of the forces generated by the application of the pressure signals and associated returns to the respective pressure sensitive means exceeds a predetermined amount.

BRIEF DESCRIPTION OF THE DRAWINGS

A full understanding of the present invention, both as to its organization and method of operation, will become apparent from a consideration of the following description taken in conjunction with the accompanying drawings which are presented by way of illustration only and are not to be taken as a limitation upon the present invention as defined in the claims appended hereto, and in which:

FIGURE 2 is a schematic illustration of one form of servo control means which may be utilized in a system of the type which is shown in FIGURE 1;

FIGURE 3 is one embodiment of a form of comparator constructed in accordance with the present invention; and FIGURE 4 is an alternative embodiment of the comparator constructed in accordance with the present invention.

DETAILED DESCRIPTION OF THE ILLUSTRATED EMBODIMENTS

Figure 1:
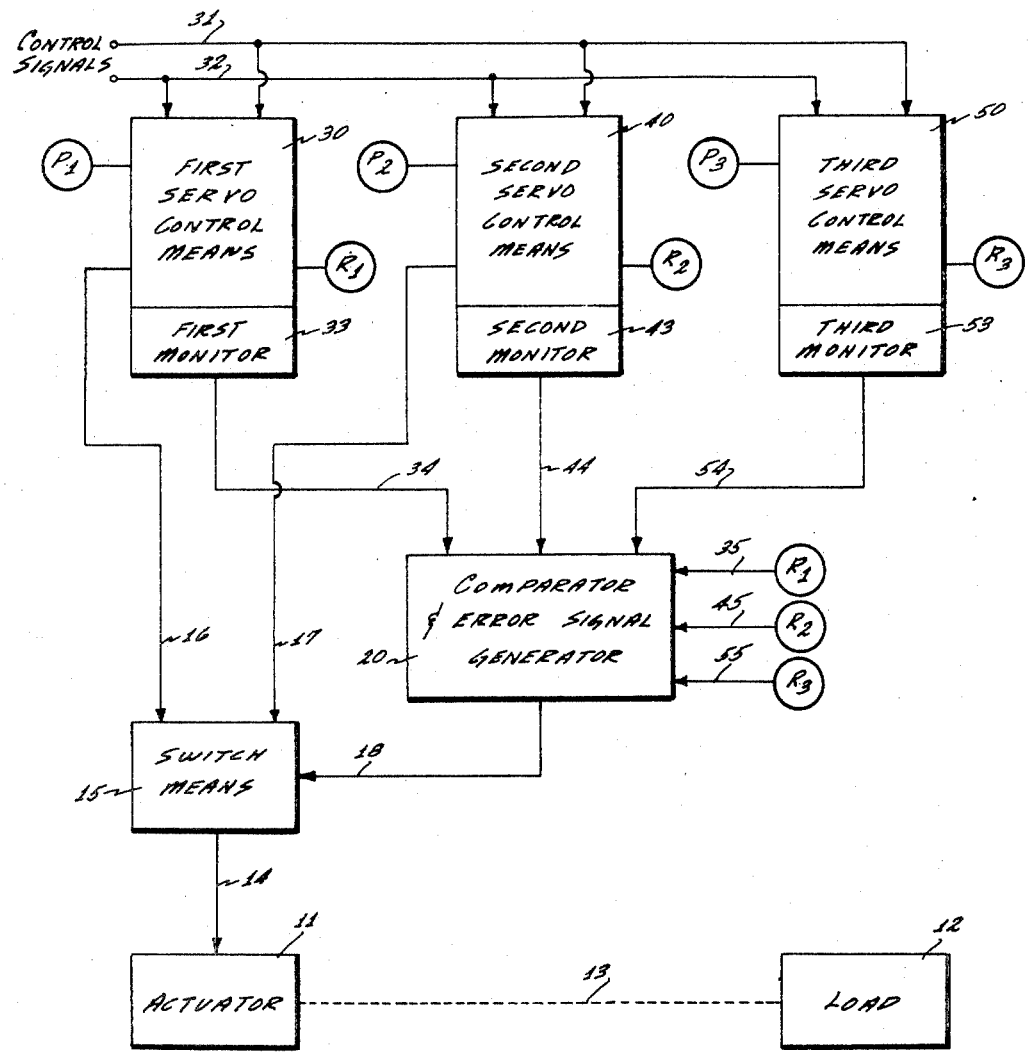
FIGURE 1 is a schematic illustration of a redundant control system which may embody a pressure compensated comparator in accordance with the present invention.

Referring to FIGURE 1, there is illustrated generally a redundant control system which is designed to provide a flow of fluid under pressure to an actuator 11 which is connected to position a load 12 as is illustrated by the dashed line 13. It should be expressly understood that the load 12 may be any desired load, such for example, as the control surface of a high performance aircraft or the like. The flow of fluid to the actuator 11 along the interconnection 14 is controlled by a switch means 15. Flow of fluid into the switch means 15 is along the lines 16 and 17 and the output from the switch means 15 is controlled by a signal provided over a line 18 from the comparator and error signal generator 20.

The signals which are applied to the comparator and error signal generator 20 are developed in servo control means, such for example, as the first, second and third servo control means 30, 40 and 50 respectively. Each of these servo control means has substantially identical control signals applied thereto over the lines 31 and 32 as illustrated. It is to be expressly understood that these control signals may be electrical, mechanical, or a combination thereof, and may be generated in any fashion known to the art. Each of the servo control means has a source of pressure $P_1$, $P_2$, $P_3$, connected respectively thereto along with its associated system return $R_1$, $R_2$, $R_3$, respectively. First, second and third monitors 33, 43, and 53 respectively are connected to the first, second and third servo control means. Each of these monitors produces a pressure signal which is proportional to the response of the respective servo control means to the input control signals applied thereto. The monitor pressure signals are applied along the lines 34, 44 and 54 respectively, from the first, second and third monitors to the comparator and error signal generator 20. It is also to be noted that the respective system returns $R_1$, $R_2$ and $R_3$ are connected to the comparator and error signal generator 20.

A particular manner in which the pressure monitor signals are generated is illustrated schematically in FIGURE 2 to which reference is hereby made. As is illustrated in FIGURE 2, a torque motor 60 consisting of an armature 61 and a coil 62 to which control signals are applied, in this instance electrical control signals, is illustrated. Application of the control signals causes the armature to pivot about a pivot point P thereby causing a flapper 63 to change its position relative to a pair of nozzles 64, 65. Movement of the flapper 63 thus causes a pressure differential to appear at the nozzles 64, 65 and through the lines 66, 67 to be applied to the chambers 68, 69. The pressure differential thus produced in the chambers 68, 69, causes the control valve 71 to translate within the cylinder 72, thus causing fluid under pressure to flow from the source P thereof to and from the actuator along the lines 73, 74, as is well known in the prior art. For further details of a servo control means which may be utilized and which is similar to that just described, reference may be had to U.S. Patent 2,947,286. As the control valve 71 translates within the cylinder 72 an additional flapper 75 which is anchored to the housing at one end thereof, as illustrated, also moves with respect to a nozzle 76 through which fluid from the source P is flowing. As the flapper 75 moves with respect to the nozzle 76, a monitor pressure signal is developed in the line 77 which at all times is proportional to the position of the control valve 71. As noted, system return R is connected by way of lines 78 to the chamber 79 within which the flappers 63 and 75 are positioned and also to the comparator. Further details of the structure as just described for providing the monitor pressure signals for application to the comparator may be had by reference to U.S. Patent 3,338,138. A similar structure to that illustrated in FIGURE 2 would be duplicated for a second and third servo control means 40 and 50 (FIGURE 1). In each instance, the pressure monitor signal connected by the line 34, 44, or 54 (FIGURE 1) would correspond to the line 77 of FIGURE 2 and the return signals applied along the lines 35, 45 and 55 of FIGURE 1 would be similar to the line 78 as shown in FIGURE 2.

Referring now more specifically to FIGURE 3, one form of comparator constructed in accordance with the present invention and adapted to be pressure compensated is illustrated. As is therein shown, a first pressure sensitive means such as a spool member 101 is slidably disposed within a cylinder 102 which is divided by the spool member 101 into a first chamber 103 and a second chamber 104. The first chamber 103 is connected by a conduit 105 to receive a pressure monitor signal, for example, along the line 34 from the first servo monitor (FIGURE 1). This pressure monitor signal is generated as shown in FIGURE 2 from pressure source P1. The chamber 104 is connected by a conduit 106 to receive the return pressure from the system return (R1) associated with the pressure monitor signal applied to the chamber 103, for example, the return R1 applied along the line 35 (FIGURE 1). Spring means 107 is inserted into the chamber 103 and bears against the end wall 108 thereof and against one face 109 of the spool member 101.

Also illustrated is a second pressure sensitive means 110 which is identical in structure to the first pressure sensitive means 100 and such is indicated by the utilization of the same reference numerals primed, as were used to describe the structure of the first pressure sensitive means 100. The second pressure sensitive means 110 is adapted to have applied thereto the pressure monitor signal, for example from the second monitor along the line 44 as shown. This pressure monitor signal is generated as shown in FIGURE 2 from pressure source P2. The return pressure from the associated fluid source such as R2 is applied along the line 45 as shown. Thus, the first and second pressure sensitive means 100 and 110 have applied thereacross the first and second monitor pressure signals and the system return pressures respectively associated therewith.

Interconnecting means in the form of a rod 121 extends between the chambers 104–104' and has one end 122 thereof in engagement with the face 123 of the spool member 101 and has an opposite end 124 thereof in engagement with the face 125 of the spool member 101'.

As is illustrated, the rod 121 is disposed within a cylinder 126 and defines a reduced diameter portion 127. The cylinder 126 defines a first port 128 and second and third ports 129 and 130, respectively. As the rod 121 translates within the cylinder 126, as will be more fully explained below, the port 128 may be placed in communication with the port 129 or the port 130, depending upon the direction and amount of translation of the rod 121. In this manner, a pressure signal source 131 may be connected along line 132 and line 18 to the switch means 15 (FIGURE 1).

It should be noted that the rod 121 must translate within the cylinder 126 by a predetermined amount designated as X before the pressure signal source 131 is connected along the line 18 as above described. This distance X can be traveled by rod 121 only when the differential in the forces generated by application of the pressure signals to the surfaces 109 and 109' of the spool members 101 and 101' respectively is sufficiently great to overcome the force applied by the respective spring means 107 or 107', depending upon the direction of travel of the rod 121. Assuming the following definitions:

$P_{m1}$ is the monitor pressure signal from the first monitor applied to chamber 103;
$P_{m2}$ is the monitor pressure signal applied from the second monitor to chamber 103';
$R_1$ is the return pressure for pressure source $P_1$;
$R_2$ is the return pressure for the pressure souce $P_2$;
$A_1$ is the cross-sectional area of the spool member 101;
$A_2$ is the cross-sectional area of the rod 121;
$A_3$ is the cross-sectional area of the spool member 101';
$F_{s1}$ is the spring constant for the spring 107; and
$F_{s2}$ is the spring constant for the spring 107', then a force balance of the comparator structure as illustrated in FIGURE 3 may be made as follows:

(1) $F_{s1} + P_{m1}A_1 - R_1A_1 + R_1A_2 = F_{s2} + P_{m2}A_3 - R_2A_3 + R_2A_2$ from design $A_1 = A_3$ let $$F_{s1} - F_{s2} = F_s$$

Differentiating for changes in $P_{m1}$ and /or $P_{m2}$ (2) $A_1 dP_{m1} - A_1 dP_{m2} = dF_s$ letting $dF_s = K_x$ (spring rate times displacement) and $$(dP_{m1} - dP_{m2}) = \Delta P_m$$

then (3) $\Delta P_m A_1 = K_x$

Knowing $\Delta P_m$ as the predetermined difference in $P_{m1}$ and $P_{m2}$ at which the comparator spool should move and transmit the signal and knowing $A_1$ (and consequently $A_3$) from design needs, the spring rate, K, or displacement, $x$ can be determined.

To find the return pressure effect, differentiate Equation 1 for variation in $P_{m1}$, $R_1$ and $F_s$:

(4) $A_1 dP_{m1} - A_1 dR_1 + A_2 dR_1 = dF_s = K_x$ or (5) $A_1(dP_{m1} - dR_1) + A_2 dR_1 = K_x$

By definition a change in $R_1$ ($dR_1$) results in the same change in $P_{m1}$ ($dP_{m1}$) or $$dP_{m1} = dR_1$$

therefore (6) $A_2 dR_1 = K_x$

The compared monitor pressure, $P_{m'1}$, will then be $$P_{m'1} = \frac{K_x}{A_1} = \frac{A_2}{A_1} dR_1$$

The percent of return pressure which will enter into the comparison of $P_{m1}$ to $P_{m2}$ will then be $$\% = \frac{\frac{A_1}{A_2} dR_1}{dR_1} \times 100 = \frac{A_2}{A_1} \times 100$$

Therefore, by making $A_1$ large with respect to $A_2$ the percent of return pressure effect can be greatly reduced.

As is well known in the art, any change in the return pressure of a given source of fluid under pressure is directly reflected in the source of fluid under pressure. It can readily, therefore, be seen that the comparator constructed in accordance with the present invention eliminates pressure fluctuations in the return of the fluid source (except for the influence of the diameter of the rod 121) from entering into the comparator function. Thus, a true error signal is developed when a structure such as that illustrated in FIGURE 3 is utilized.

Referring now to FIGURE 4, an alternative embodiment of the structure as illustrated in FIGURE 3 is shown. As will be readily apparent to those skilled in the art, the primary difference between the two structures is that in FIGURE 4 a single spring 151 is utilized as the predetermined preload as opposed to having a spring positioned in contact with each of the cylinder means. To utilize a single spring 151, an extension rod 152 is affixed to the spool means 153 and terminates in a headed portion 154. Retainer rings 155 and 156 are positioned within the chamber 157 to hold the spring 151 in place and to provide good force transfer between the comparator mechanism and the spring as it moves in either direction. In all other respects, the device as shown in FIGURE 4 is the same as that illustrated in FIGURE 3 and above described. Therefore, additional description of the FIGURE 4 embodiment will not be further provided at this point.

What is claimed is:

1. A comparator for detecting disparity between first and second pressure signals applied thereto comprising:
   a first pressure sensitive means connected to receive said first pressure signal and the system return associated therewith;
   a second pressure sensitive means connected to receive said second pressure signal and the system return associated therewith;
   means interconnecting said first and second pressure sensitive means to provide an output signal only when the algebraic sum of the forces from said first and second pressure signals and associated returns is greater than a predetermined amount.

2. A comparator as defined in claim 1 wherein said first and second pressure sensitive means are each a movable spool member having the respective pressure signal and associated return applied to opposite faces thereof, said opposite faces being effectively fluid pressure isolated from each other.

3. A comparator as defined in claim 2 wherein said predetermined amount is determined by spring means connected to effectively restrain movement of said spool members until said predetermined amount is exceeded.

4. A comparator as defined in claim 3 wherein said interconnecting means is a rod in engagement with each of said spool members, said rod, upon movement of said spool members, establishing communication with pressure thereby to provide said output signal.

5. A comparator as defined in claim 4 wherein the cross-sectional area of said rod is substantially less than the cross-sectional area of each of said spool members.

6. A comparator for detecting disparity between first and second pressure signals applied thereto comprising:
   first cylinder means;
   a first slidable member disposed in said first cylinder means to define first and second substantially isolated chambers therein;
   means connecting said first pressure signal and the system return associated therewith to said first and second chambers respectively;
   second cylinder means;
   a second slidable member disposed in said second cylinder means to define third and fourth substantially isolated chambers therein;
   means connecting said second pressure signal and the system return associated therewith to said third and fourth chambers respectively;
   switch means operable by movement of said slidable members in response to disparity between said first and second pressure signals.

7. A comparator as defined in claim 6 wherein said switch means is a third slidable member disposed in a third cylinder means, said third slidable member being in effective driven engagement with said first and second slidable members.

8. A comparator as defined in claim 6 wherein said third cylinder means defines first and second parts, communication therebetween being blocked by said third slidable member except during the time when said first and second slidable members move responsively to disparity between said first and second pressure signals.

References Cited

UNITED STATES PATENTS 3,338,139 8/1967 Wood.
3,426,650 2/1969 Jenney.
3,401,600 9/1968 Wood.

ARNOLD ROSENTHAL, Primary Examiner

U.S. Cl. X.R.

91—411, 461